United States Patent [19]

Armbrust et al.

[11] 3,999,632
[45] Dec. 28, 1976

[54] VIBRATION DAMPENING BEARING RING SPACER MEANS

[75] Inventors: William D. Armbrust, Greensburg; Robert S. Gulibon, Mount Pleasant; Alan L. Echtenkamp, Greensburg, all of Pa.

[73] Assignee: Kennametal Inc., Latrobe, Pa.

[22] Filed: Aug. 29, 1975

[21] Appl. No.: 608,923

[52] U.S. Cl. .............................. 188/1 B; 308/126; 408/143
[51] Int. Cl.² .......................................... F16F 7/08
[58] Field of Search ..................... 64/1 V; 188/1 B; 308/26, 184 R, 200, 237 A; 408/143

[56] References Cited
UNITED STATES PATENTS

| 2,515,861 | 7/1950 | Campbell | 308/26 |
| 2,581,656 | 1/1952 | Harless | 308/26 X |
| 3,207,014 | 9/1965 | Carlstedt | 188/1 B X |
| 3,559,512 | 2/1971 | Aggarwal | 188/1 B X |
| 3,690,414 | 9/1972 | Aggarwal et al. | 188/1 B |

*Primary Examiner*—Duane A. Reger
*Attorney, Agent, or Firm*—Lawrence R. Burns

[57] ABSTRACT

A power driven rotary tool having a specially constructed bearing ring spacer means adapted to oppose self-induced vibrations. The power driven rotary tool comprises an outer housing frame, a driven rotatable shaft, a set of antifriction bearings disposed between the outer frame and the rotatable shaft for support of the rotatable shaft, a bearing ring spacer means in solid contact with either the outer housing frame or the outer races of the antifriction bearing and between a set of antifriction bearings, longitudinal passageways provided in the bearing ring spacer means and rigid impact elements disposed in the passageway to oppose self-induced vibrations with a power driven rotary tool.

13 Claims, 3 Drawing Figures

VIBRATION DAMPENING BEARING RING SPACER MEANS

BACKGROUND OF THE INVENTION

In most power driven rotary tools, such as grinding wheels and the like, there is a driven rotatable shaft which overhangs its general support frame which is adapted for tool attachment. The overhanging or protruding shaft, when doing work upon a workpiece, has a propensity for undesired vibration which can produce chatter marks upon a metal workpiece.

There are two types of vibration which the power driven rotary shaft can experience. The first one is from vibration from contact with the workpiece and the second type being self-induced vibrations from the power tool itself. Usually, a power driven rotary tool will support a driven rotary shaft by at least a pair of spaced antifriction bearings, one of the antifriction bearings being at the forward end of the housing near the workpiece and the second antifriction bearing spaced rearwardly from the first antifriction bearing a sufficient distance to provide rigid support for the rotary shaft.

When supported by a pair of such antifriction bearings, a bearing spacer ring is normally used to keep the bearings or the races of the bearings from moving axially along the shaft.

It would be desirable in power driven rotary tools, where the space has already been provided in their construction, for a cylindrical bearing spacer means to substitute a vibration dampening mechanism to improve the finished quality desired on a workpiece.

In many tools, the space is probably available to make a direct substitution with a device according to the present invention.

Patents related in subject matter to that of the present invention are known by the applicant. Specifically, U.S. Pat. No. 3,164,041 to Carlstedt, U.S. Pat. No. 3,207,009 to Carlstedt, and U.S. Pat. No. 3,207,014 to Carlstedt evidence the best knowledge of the prior art known to applicant.

BRIEF SUMMARY OF THE INVENTION

A bearing ring spacer means is provided for vibration dampening in a power driven rotary tool having an outer housing frame, a centrally driven rotatable shaft and antifriction bearings disposed and supported between the rotatable shaft and the outer housing frame. The bearing ring spacer means is disposed in firm contact either with the inside diameter of the outer housing frame or the outer races of the antifriction bearing and is in end to end engagement with each of the antifriction bearings.

The bearing ring spacer means is cylindrical in nature and has longitudinal passageways formed therein extending from one end through the other. Rigid impact elements of unusually dense material are disposed in the longitudinal passageways and a predetermined amount of clearance is provided between the rigid impact elements and longitudinal passageways so that, upon vibration, the rigid impact elements oppose the direction of movement of the vibration.

The bearing ring spacer means is located in a normal power driven tool where the usual bearing ring outer spacer means would be located. There is also provided an inner spacer means which rotates with the shaft and is in end to end relationship with the antifriction bearings. A central lubricating passage is provided by longitudinal grooves on the inside diameter of the bearing ring spacer means.

Advantageously, and where applicable, the bearing ring spacer means should be in firm contact with the outer races of the antifriction bearing and so held to dampen vibrations so that a clearance between the bearing ring spacer means and the inside diameter of the housing will result in a freely interchangeable fit between the two.

The exact nature of the present invention will become more clearly apparent upon reference to the following detailed specification taken in connection with the accompanying drawings in which.

DETAILED DESCRIPTION OF THE INVENTION

Figure 1:
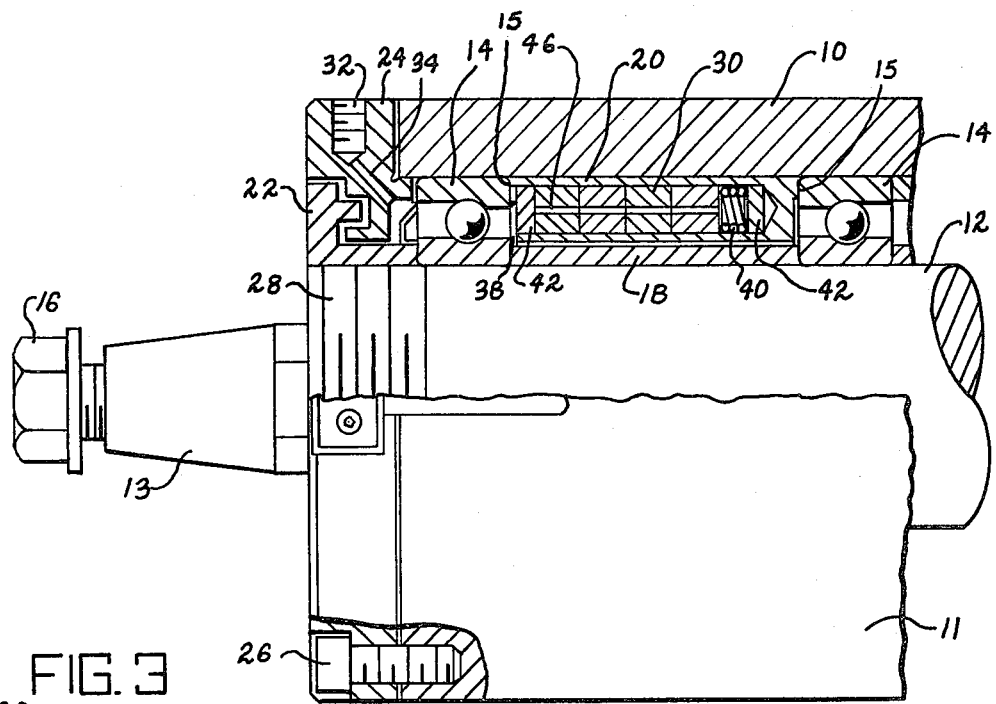
FIG. 1 is the side view of a power driven rotary tool with the top portion cut away to view the structure of the present invention.

Referring to the drawings somewhat more in detail, a power driven rotary tool 11 is shown in FIG. 1. The cut away portion at the top shows the outer housing frame 10. The driven rotatable shaft 12 and the set of antifriction bearings 14 disposed between the rotatable shaft 12 and the outer housing frame 10 are shown therein.

The antifriction bearings 14 are in direct contact with the outer housing frame 10 on their outside diameter and also in direct contact with rotatable shaft 12 on their inside diameter. A driven rotatable shaft has an overhanging portion 13 extending from the housing frame which is equipped with a nut 16 threaded on its outer end and adapted for attaching tools such as grinding wheels thereon.

Located between the antifriction bearings 14 is the bearing ring spacer means 20 which is in direct contact with the inside diameter of outer housing frame 10 or has overhanging portions 15 in direct contact with the outer races of antifriction bearing 14 and is stationary with respect thereto. Inner space ring 18 is shown in direct contact with rotatable shaft 12 and rotates therewith. Both of these bearing ring spacers 20 and 18 keep antifriction bearings 14 from relative axial movement while the tool is in operation.

According to the present invention, the bearing ring spacer means 20 is provided with circumferentially distributed longitudinal passageways 38 which extend from one end of a bearing ring spacer means through the other end. Inside longitudinal passageway 38, rigid impact elements 30 are placed in side by side relationship with one another.

Preferably, the rigid impact elements 30 will be urged into side by side relation with one another by means of fixed end elements 42 confining the rigid impact elements in longitudinal passageway 38 and spring 40 placed between one of the fixed end elements 42 and the rigid impact elements 30. The rigid impact elements 30 may be provided with a central through hole 46 which prevents entrapment of air which might otherwise cushion or restrict the movements of rigid impact elements 30.

In the particular structural arrangement shown, end element 24 is affixed to outer frame housing 10 and a second end element 22 is threaded on threads 28 of rotatable shaft 12. End element 32 is securely attached to outer housing frame 10 by screws 26 as shown.

With this arrangement, it can be seen that the lubrication of the bearings can be accomplished by introducing lubricant through threaded hole 32 to lubricant passageway 34 and into the antifriction bearings 14. The clearance provided between first end element 24 and second end element 22 can also provide for a lubricant escape passage.

It can be seen that, while FIG. 1 is one end of a support housing arrangement, the entire housing may consist of multiples of the arrangement shown. Therefore, by proper arrangement of sealing mechanisms, one could introduce lubricant through passage 32 and force it through the bearings to the extreme other end of the housing arrangement and expel it through an oil passage escape means as shown between first and second elements 24 and 22.

Figure 2:
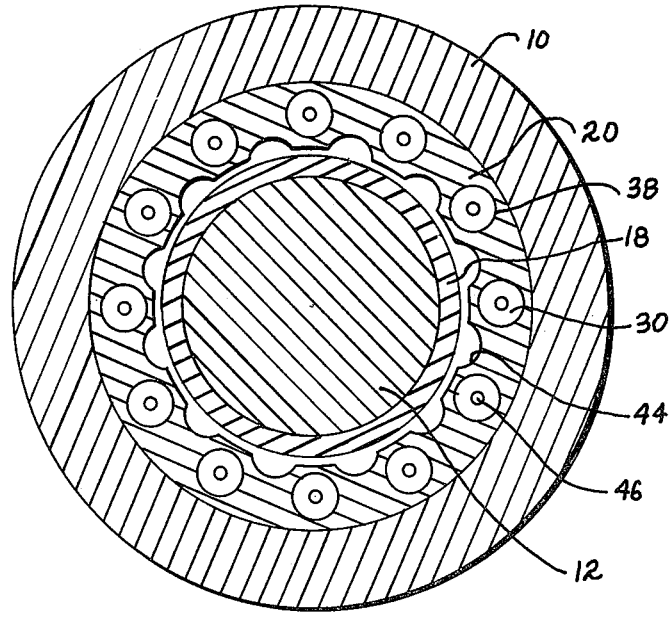
FIG. 2 is an end view looking along arrow II—II of FIG. 1.

In FIG. 2 is shown the end view of a bearing ring spacer means according to the present invention. FIG. 2 shows the arrangement of outer housing frame 10 in line to line contact with the bearing ring spacer means 20. When the bering ring spacer means 20 has overhanging portion 15 in contact with the outer races of antifriction bearings 14, a small clearance will be provided instead of a line to line contact. The bearing ring spacer means 20, having longitudinal passageway 38 with rigid impact elements 30 therein, are shown with a central through hole 46 to provide for air movement within the longitudinal passageways.

The inner spacer ring 18 is shown in line to line contact with rotatable shaft 12 as described above. As will be seen by FIG. 2, the bearing ring spacer rings 20 is provided with longitudinal grooves 44 on its inside diameter to assist the flow of lubricant axially along the shaft during operation.

Figure 3:
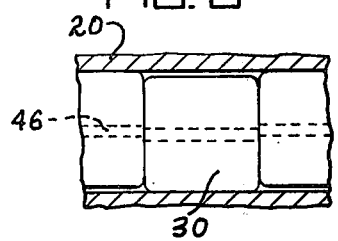
FIG. 3 is a detailed view of the longitudinal passageway in the bearing ring spacer means.

In FIG. 3 is shown a more detailed view of the rigid impact elements 30 in longitudinal passageway 38. The rigid impact elements 30 are preferably made of Kennertium which is an unusually dense tungsten containing material. The rigid impact elements 30, when they are urged together as shown in FIG. 1 with spring 40, will be in side by side relationship in longitudinal passageway 38 and will assume random positioning as self-induced vibration occurs.

The rigid impact elements will move upward to strike the wall of longitudinal passageway 38 when a downward vibrational force is encountered. This random motion of the rigid impact elements 30 striking the wall of passage 38 significantly dampens all self-induced vibration of power driven rotary tool 11.

The rigid impact elements while shown herein are preferably disc-like; however, they may take other shapes or configurations such as spheres, for example. The relative dimensions of the impact elements may also vary from each individual impact element to another and thereby provide distinctly random action by the entire group of impacts within the longitudinal passageway.

Overhanging portions 15 on bearing ring spacer means may not be necessary if enough frictional engagement is developed between the outer races of the antifriction bearings and the bearing ring spacer means when in a flat side to side engagement.

Modifications may be made within the scope of the appended claims.

What is claimed is:
1. In a power tool having an outer housing frame, antifriction bearings having inner races and outer races mounted inside the housing frame, bearing ring spacer means disposed between said antifriction bearing and a driven rotatable shaft mounted and supported on the inner race of said antifriction bearing, the improvement which comprises; the outer race of said antifriction bearing supported by solid contact to said housing frame, said bearing ring spacer means being supported by solid contact with said housing frame, a plurality of longitudinal passageways formed in said bearing ring spacer means in circumferentially distributed relation, a plurality of rigid impact elements carried within each said passageway, the clearance between said plurality of impact elements and said passageway chosen so that the vibrations of said outer housing frame will be opposed by radial impacts of said impact elements against said passageway.

2. A power tool according to claim 1 in which said bearing ring spacer means is also in firm contact with and supported by said outer races of said antifriction bearings.

3. A power tool according to claim 2 which further comprises an inner spacer ring mounted on said driven shaft and having opposing ends in abutment with the inner races of said antifriction bearings.

4. In a power tool having an outer housing frame, at least one antifriction bearing having an inner race and outer race mounted inside said housing frame, a bearing ring spacer means mounted in said housing to spatially locate said antifriction bearing and a driven rotatable shaft mounted and supported on the inner race of said antifriction bearing, the improvement which comprises; the outer race of said antifriction bearing supported by solid contact with a housing frame wall and said bearing ring spacer means supported by solid contact with the housing frame wall, a plurality of longitudinal passageways formed in said bearing ring spacer means in a circumferentially distributed relation, a plurality of rigid impact elements carried within each said passageway, the clearance between said plurality of impact elements and said passageway chosen so that the vibrations of said outer housing frame wall will be opposed by radial impacts of said impact elements against said passageway.

5. A power tool according to claim 4 in which said bearing ring spacer means is also in firm contact with and supported by said outer race of said antifriction bearing.

6. A power tool according to claim 5 which further comprises an inner spacer ring mounted in said driven shaft and having at least one end in abutment with the inner race of said antifriction bearing.

7. A bearing ring spacer means adapted for placement in an outer housing of a power driven rotary tool so as to spatially locate at least one antifriction bearing having an outer race in solid contact with a wall of the outer housing, said bearing ring spacer means having an outer surface adapted for solid contact with the wall of the outer housing so as to be supported thereby and a plurality of longitudinal passageways formed in said bearing ring spacer means in a circumferentially distributed relation, a plurality of rigid impact elements carried within each said passageway, the clearance between said plurality of impact elements and said passageway chosen so that the vibration of said outer housing wall will be opposed by radial impacts of said impact elements against said passageway.

8. A bearing ring spacer means according to claim 7 which further comprises at least one end of said spacer means adapted for direct abutment with an outer race of an antifriction bearing so as to directly dampen radial vibration on said antifriction bearing.

9. A bearing ring spacer means according to claim 8 in which at least one end of said spacer means has an overhanging portion for contact with an outer race of an antifriction bearing.

10. In a power tool having an outer housing frame, at least one antifriction bearing having an inner race and an outer race mounted in said housing frame, a bearing ring spacer means mounted in said housing to spatially locate said antifriction bearing and a driven rotatable shaft mounted and supported on the inner race of said antifriction bearing, the improvement which comprises; said bearing ring spacer means having means for dampening vibrations and said outer race of said antifriction bearing mounted in solid contact with a wall of said housing frame and said bearing ring spacer means mounted in solid contact with the wall of the housing frame.

11. In a power tool having an outer housing frame, at least one antifriction bearing having an inner race and an outer race mounted in said housing frame, a bearing ring spacer means mounted in said housing to spatially locate said antifriction bearing and a driven rotatable shaft mounted and supported on the inner race of said antifriction bearing, the improvement which comprises; said bearing ring spacer means having means for dampening vibrations, said outer race of said antifriction bearing mounted in solid contact with a wall of said housing frame and said bearing ring spacer means mounted in solid contact with said outer race of said antifriction bearing.

12. The method of minimizing vibration in a power tool having an outer housing frame, an antifriction bearing having inner and outer races, a driven rotatable shaft mounted on said inner race and a bearing ring spacer means for spatially locating said antifriction bearing, said method comprising; providing a vibration dampening mechanism in said bearing ring spacer means, contacting a wall of the outer housing of the power tool with the outer race of the antifriction bearing, and contacting and supporting the bearing ring spacer means on the outer race of the antifriction bearing.

13. The method according to claim 12 which further includes forming longitudinal passageways in the bearing ring spacer means, inserting a plurality of rigid impact elements in said passageway and sizing the clearance between said impact elements and said passageway so that vibrations transferred to the outer race of the antifriction bearing will be dampened by the movement of the impacts against the passageway.

* * * * *